(12) United States Patent
Kim

(10) Patent No.: US 8,463,812 B2
(45) Date of Patent: Jun. 11, 2013

(54) APPARATUS FOR PROVIDING SOCIAL NETWORK SERVICE USING RELATIONSHIP OF ONTOLOGY AND METHOD THEREOF

(75) Inventor: Jung-Tae Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 151 days.

(21) Appl. No.: 12/971,260

(22) Filed: Dec. 17, 2010

(65) Prior Publication Data

US 2011/0153665 A1  Jun. 23, 2011

(30) Foreign Application Priority Data

Dec. 18, 2009 (KR) .................. 10-2009-0126731
Apr. 12, 2010 (KR) .................. 10-2010-0033394

(51) Int. Cl.
  *G06F 17/30* (2006.01)
(52) U.S. Cl.
  USPC ........................................... 707/778
(58) Field of Classification Search
  USPC ........................................... 707/776
  See application file for complete search history.

(56) References Cited

U.S. PATENT DOCUMENTS

2007/0255831 A1   11/2007 Hayashi et al.
2008/0005147 A1*  1/2008 Khushraj et al. ............ 707/102
2008/0208774 A1*  8/2008 Kim et al. .................... 706/12
2008/0208973 A1   8/2008 Hayashi et al.
2009/0012841 A1*  1/2009 Saft et al. .................... 705/10
2010/0228590 A1*  9/2010 Muller et al. ................ 705/10
2010/0257028 A1* 10/2010 Hillerbrand ................. 705/10
2011/0040776 A1*  2/2011 Najm et al. .................. 707/766
2012/0041983 A1*  2/2012 Jennings ..................... 707/784
2012/0047143 A1*  2/2012 Petersen et al. ............. 707/738

FOREIGN PATENT DOCUMENTS

KR   10-2009-0053109   5/2009
KR   10-2009-0058556   6/2009
WO   2007/127642       11/2007

* cited by examiner

Primary Examiner — Wilson Lee
Assistant Examiner — Thuy Bui
(74) Attorney, Agent, or Firm — Staas & Halsey LLP

(57) ABSTRACT

Provided are an apparatus for providing a social network service using the relationship of ontology and a method thereof. The apparatus includes: an ontology storage unit storing social ontology defining relationship information between a user and a social network subscriber, service ontology defining position and relationship information of services, and tag ontology defining tag information related to information included in the social ontology and the service ontology; when a service request is inputted from the user, an ontology analysis unit retrieving a tag corresponding to the user's current position and the service request factor by using the relationship of the ontologies stored in the ontology storage unit; a service processing unit extracting the corresponding service on the basis of the retrieved tag information; and a service providing unit providing the user with the extracted service.

3 Claims, 5 Drawing Sheets

FIG.3A

| Thing | CategoryHighClass (relCode) | CategoryMiddleClass | | | |
|---|---|---|---|---|---|
| TOUR THING (tourID) | HEALTH THING S-010 | HEALTH FOOD S-011 | HOSPITAL S-012 | PHARMACY S-013 | |
| | AMUSEMENT THING S-020 | GOLF S-021 | FISHING S-022 | CLIMBING S-023 | SKIING S-024 |
| | FOOD THING S-030 | WESTERN FOOD S-031 | JAPANESE FOOD S-032 | KOREAN TRADITIONAL FOOD S-033 | |
| | SEEING THING S-040 | HISTORICAL SITE S-041 | NATURAL CAVE S-042 | THEME PARK S-043 | WATERFALL S-044 / BEACH S-045 |
| | BUYING THING S-050 | WHOLESALE MART S-051 | DUTY-FREE SHOP S-052 | DEPARTMENT STORE S-053 | TRADITIONAL MARKET S-054 |
| | SLEEPING THING S-060 | CONDO S-061 | PENSION S-062 | HOTEL S-063 | |
| | RIDING THING S-070 | RENT CAR S-071 | BUS S-072 | CALL TAXI S-073 | AIRPLANE S-074 |

FIG.3B

| Loc | PROVINCE | CITY | |
|---|---|---|---|
| LOCATION (locCode) | JEJU ISLAND | SEOQUIPO CITY | NORTH JEJU DISTRICT |
| | L01-064 | L01-064-01 | L01-064-02 |
| | SEOUL CITY | GANGNAM DISTRICT | SEOCHO DISTRICT |
| | L01-020 | L01-020-01 | L01-020-02 |
| | NORTH GYEONGSANG PROVINCE | GYEONGJU CITY | GUMI CITY |
| | L01-054 | L01-054-01 | L01-054-02 |

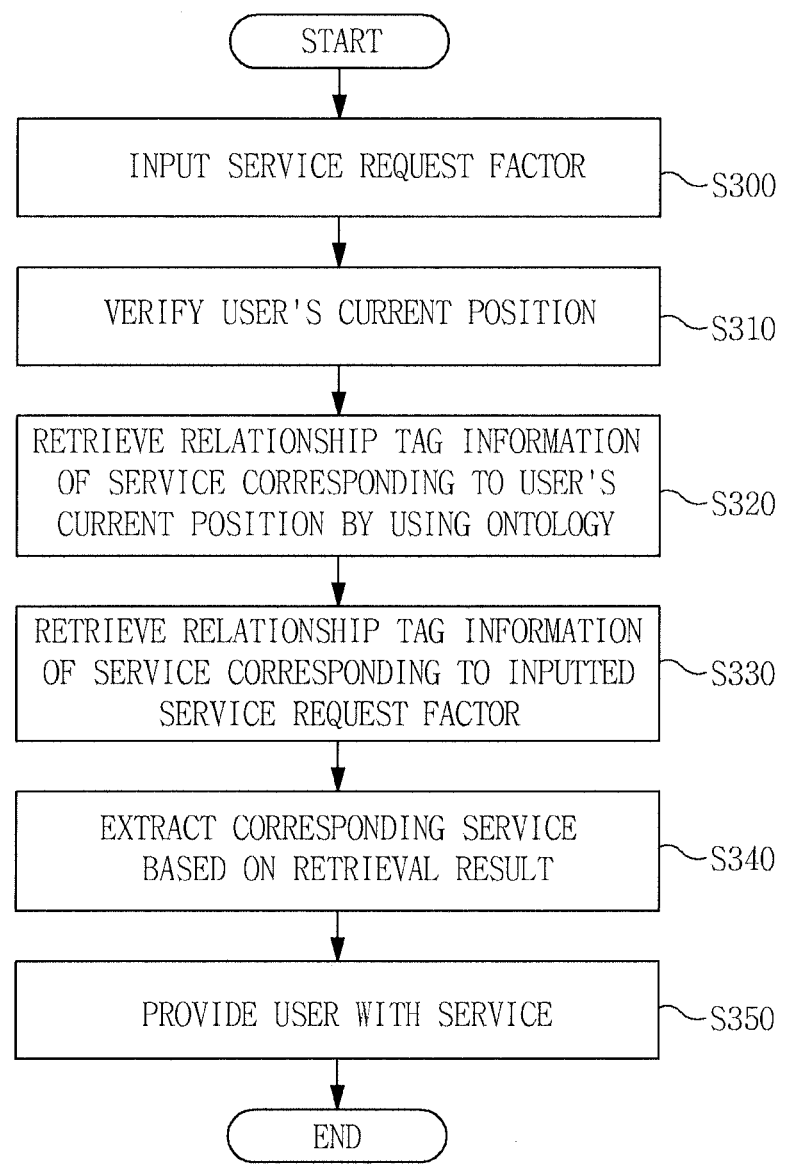

APPARATUS FOR PROVIDING SOCIAL NETWORK SERVICE USING RELATIONSHIP OF ONTOLOGY AND METHOD THEREOF

CROSS REFERENCE TO RELATED APPLICATIONS

This application claims priority to Korean Patent Application No. 10-2009-0126731 filed on Dec. 18, 2009 and Korean Patent Application No. 10-2010-0033394 filed on Apr. 12, 2010, the entire contents of which are herein incorporated by reference.

BACKGROUND OF THE INVENTION

1. Field of the Invention

The present invention relates to an apparatus for providing a social network service using the relationship of ontology and a method thereof, and in particular, to an apparatus for providing a social network service using the relationship of ontology and a method thereof for solving various problems by forming a network of people immediately sharing information and having social relationship in a location or space where the user is positioned by overcoming limits in various existing media services based on the Internet and constituting ontology related to service data, social relationship information, and a social tag in order to provide more active and intelligent social media service to a user in link with the service data.

2. Description of the Related Art

In the case of general web services or retrieval services, service information is classified by categories of each service.

Accordingly, a user directly retrieves services classified by categories when the user wants to use the retrieval service.

SUMMARY OF THE INVENTION

The present invention has been made in an effort to provides an apparatus for providing a social network service using the relationship of ontology integrated through inter-operation of a user (UserID), location information (LocationID), and tag information (Tags) by using service data and information ontology, and user's social relationship information ontology and a method thereof.

The present invention has been made in another effort to provide an apparatus for providing a social network service using the relationship of ontology and a method thereof for solving various problems by immediately sharing information and forming a network of people having social relationship in a location or space where the user is positioned by overcoming limits in various existing media services based on the Internet and constituting ontology related to service data, social relationship information, and a social tag in order to provide more active and intelligent social media service to a user in link with the service data.

An exemplary embodiment of the present invention provides an apparatus for providing a social network service using the relationship of ontology that includes: an ontology storage unit storing social ontology defining relationship information between a user and a social network subscriber, service ontology defining position and relationship information of services, and tag ontology defining tag information related to information included in the social ontology and the service ontology; an ontology analysis unit retrieving a tag corresponding to the user's current position and the service request factor by using the relationship of the ontologies stored in the ontology storage unit when a service request factor is inputted from the user; a service processing unit extracting the corresponding service on the basis of information of the retrieved tag; and a service providing unit providing the user with the extracted service.

The social ontology includes at least one of user's personal information, the user's current positional information, and the relationship information between the user and the social network subscriber.

The ontology analysis unit retrieves relationship tag information of a social network subscriber corresponding to the service request factor among the relationship information with the social network subscriber defined in the social ontology.

The service ontology includes at least one of the information on the services, and related positional information and relationship information of the services.

The ontology analysis unit retrieves relationship tag information of a service corresponding to the user's current position by comparing the user's current position with the related positional information of the services defined in the service ontology.

The ontology analysis unit retrieves relationship tag information of a service corresponding to the service request factor among the information on the services defined in the service ontology.

The tag ontology includes at least one of the tag information on the information included in the social ontology and the service ontology, and the relationship information between the tags.

The apparatus further includes an information collecting unit collecting the user's current positional information when the service request factor is inputted from the user.

The user's current positional information is GPS information detected by a GPS module.

Another embodiment of the present invention provides a method for providing a social network service using the relationship of ontology that includes: storing social ontology defining relationship information between a user and a social network subscriber, service ontology defining position and relationship information of services, and tag ontology defining tag information related to information included in the social ontology and the service ontology; when a service request factor is inputted from the user, retrieving a tag corresponding to the user's current position and the service request factor by using the relationship of the ontologies; extracting the corresponding service on the basis of information of the retrieved tag; and providing the user with the extracted service.

The social ontology includes at least one of user's personal information, the user's current positional information, and the relationship information between the user and the social network subscriber.

The retrieving retrieves the user's current position and relationship tag information of a social network subscriber corresponding to the service request factor among the relationship information with the social network subscriber defined in the social ontology.

The service ontology includes at least one of the information of the services, and related positional information and relationship information of the services.

The retrieving retrieves relationship tag information of a service corresponding to the user's current position among the related positional information of the services defined in the service ontology.

The retrieving retrieves relationship tag information of a service corresponding to the service request factor among the information on the services defined in the service ontology.

The tag ontology includes at least one of the tag information of the information included in the social ontology and the service ontology, and the relationship information between the tags.

The method further includes collecting the user's current positional information when the service request factor is inputted from the user.

The user's current positional information is GPS information detected by a GPS module.

According to the embodiments of the present invention, it is possible to provide integrated ontology through interoperation of a user (UserID), location information (LocationID), and tag information (Tags) by using service data and information ontology, and user's social relationship information ontology through a method for providing ontology and a management apparatus for providing a location/social relationship recognition type social network service (SNS). Therefore, it is possible to overcome limits in various existing media services based on the Internet.

Further, According to the embodiments of the present invention, it is possible to provide a more active and intelligent social media service to a user by immediately sharing information and forming a network of people having social relationship in a location or space where the user is positioned and by linking with the service data.

BRIEF DESCRIPTION OF THE DRAWINGS

FIGS. 3A and 3B are exemplary diagrams referenced for describing a service classification structure of service ontology according to an exemplary embodiment of the present invention; and FIG. 4 is a flowchart showing an operational flow for a method for providing a social network service using the relationship of ontology according to an exemplary embodiment of the present invention.

DETAILED DESCRIPTION OF THE PREFERRED EMBODIMENTS

Hereinafter, exemplary embodiments of the present invention will be described with reference to the accompanying drawings.

An apparatus for providing a social network service using the relationship of ontology according to an exemplary embodiment of the present invention provides a more active and intelligent social media service to a user by immediately sharing information and forming a network of people having social relationship in a location or space where the user is positioned by overcoming limits in various existing media services based on the Internet and by linking with the service data.

In this case, the apparatus for providing a social network service using the relationship of ontology provides a dynamic service depending on the position through the interoperation between service information and user's positional information by constructing social ontology defining social relationship information, service ontology, and tag ontology defining tag-related information of a social network.

Figure 1:
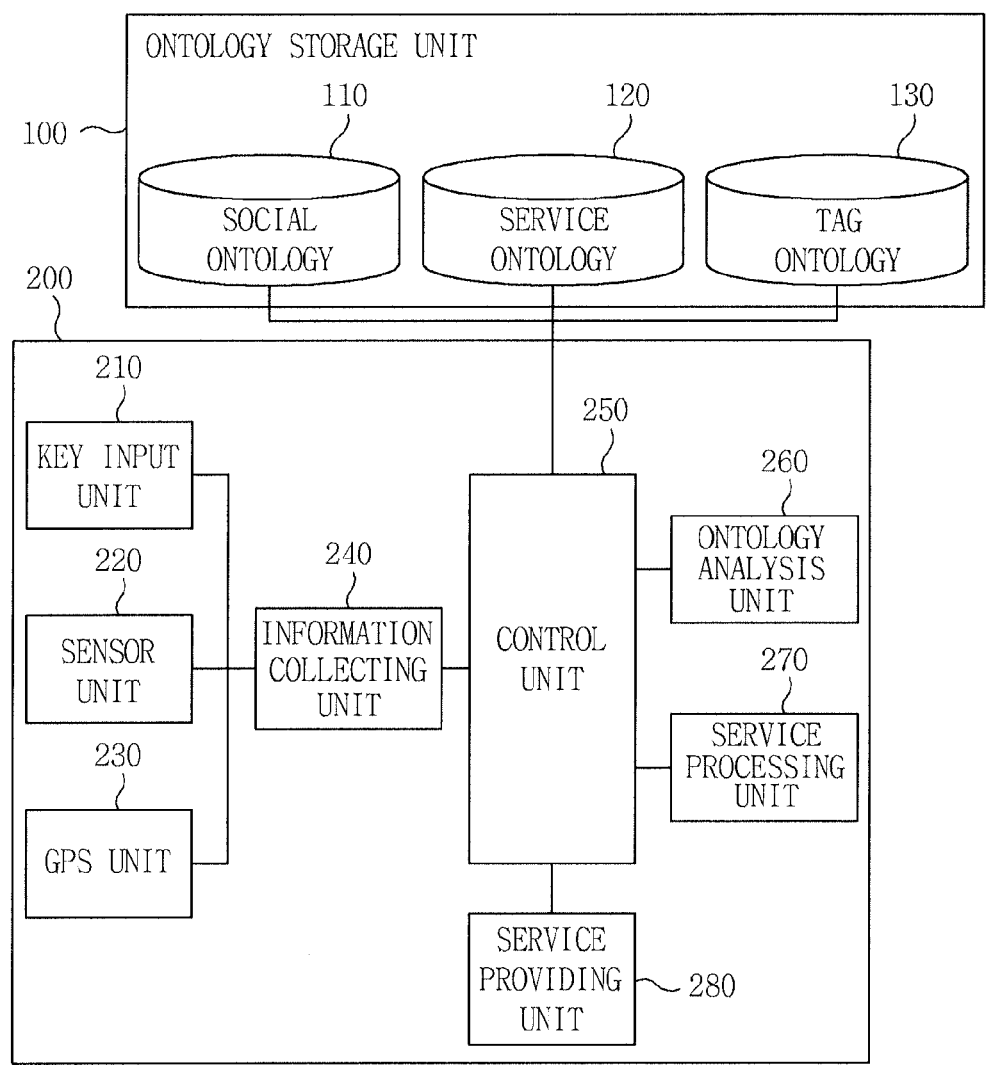
FIG. 1 is a block diagram showing a configuration of an apparatus for providing a social network service using the relationship of ontology according to an exemplary embodiment of the present invention.

FIG. 1 is a block diagram showing a configuration of an apparatus for providing a social network service using the relationship of ontology according to an exemplary embodiment of the present invention.

As shown in FIG. 1, the social network service providing apparatus 200 using the relationship of ontology according to the embodiment of the present invention includes an ontology storage unit 100 and further includes the service providing apparatus 200 providing the social network service by using an ontology structure of the ontology storage unit 100.

The social ontology 110 defining relationship information between a user and a social network subscriber, the service ontology 120 defining positional and relationship information of services, and the tag ontology 130 defining the tag information related to the information included in the social ontology 110 and the service ontology 120 are stored in the ontology storage unit 100.

Figure 2A:
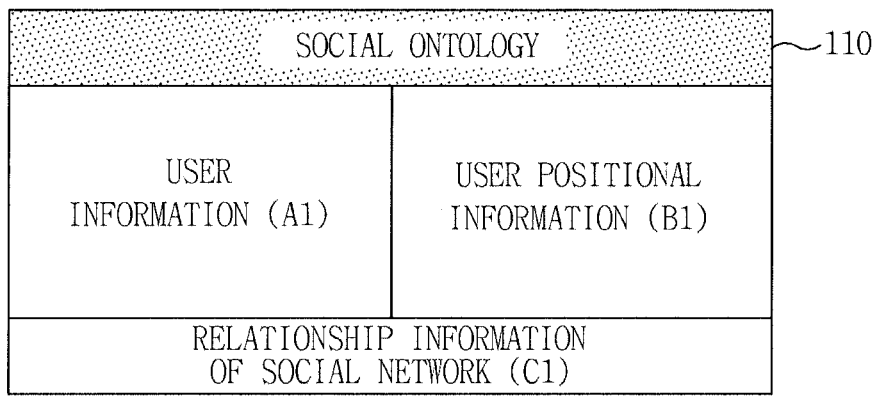
FIG. 2A is an exemplary diagram showing a structure of social ontology according to an exemplary embodiment of the present invention.

Herein, the structure of the social ontology will be described with reference to FIG. 2A.

As shown in FIG. 2, the social ontology 110 includes at least one of user's personal information, user's current positional information, and the relationship information between the user and the social network subscriber. In this case, the social ontology 110 has a structure in which the user's personal information, the user's current positional information, and the relationship information between the user and the social network subscriber are classified.

As one example, in the structure of the social ontology 110, the user's personal information may include an ID, a name, sex, an e-mail, a photograph, etc., of the user. Further, in the structure of the social ontology 110, the user's current positional information includes GPS information detected by a GPS module at a location where the user is positioned at a time when the user requests a service. In addition, in the structure of the social ontology 110, the relationship information between the user and the social network subscriber may be classified into social relationship such as a family, a friend, a colleague at a work place, a lover, others.

Meanwhile, the relationship information between the user and the social network subscriber may be classified into the positional relationship with the user. For example, the relationship information with the social network subscriber may include distance information between the user and the social network subscriber and relationship information of the subscriber of the social network of the location at which the user is positioned. Further, the relationship information with the social network subscriber may include relationship information as an author on a tag registered at the time of using the service.

In addition, a structure of the service ontology will be described with reference to FIG. 2B.

Figure 2B:
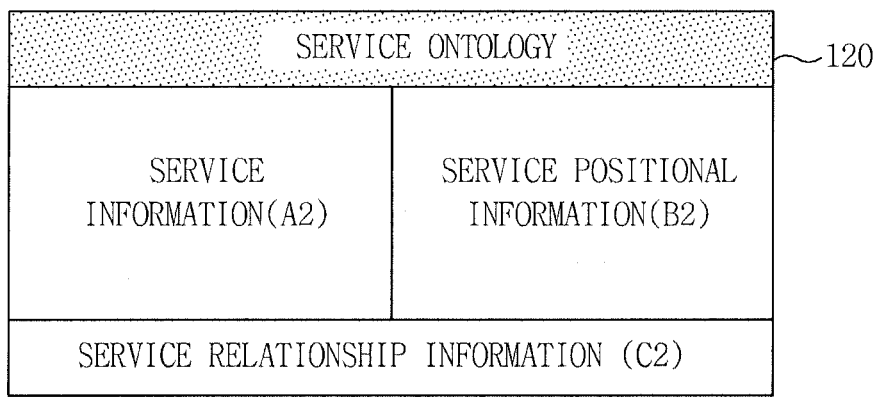
FIG. 2B is an exemplary diagram showing a structure of service ontology according to an exemplary embodiment of the present invention.

As shown in FIG. 2B, the service ontology 120 includes at least one of information on services, and related position information and relationship information on each of the services.

In this case, the service ontology 120 has a structure in which the information on the services, and the related position information and relationship information on each of the services are classified.

The service ontology 120 including service information defines relationship information for each detailed service information (instance) in the ontology by classifying information of a service which the corresponding user is using.

In the structure of the service ontology 120, the information on the services has a structure in which registered service information is classified into large, medium, and small sizes. In this case, the classification information of the services is included in the relationship information. In the structure of the service ontology 120, the structure in which the service information is classified into large, medium, and small sizes depending on the relationship information of the services will be described with reference to an embodiment of FIG. 3A.

FIG. 3A illustrates service relationship information of a service ontology structure for providing a location/social relationship recognition type social network service.

In the embodiment of FIG. 3A, a tour thing is classified into a medium category (CategoryHighClass) including a health thing, an amusement thing, a food thing, a seeing thing, a buying thing, a sleeping thing, and a riding thing on the basis of a large category and the health thing is again classified into a smaller category (CategoryMiddleClass) categorized under health foods, a hospital, and a pharmacy.

Further, the amusement thing is classified into a smaller category categorized under golf, fishing, climbing, and skiing and the food thing is again classified into a smaller category categorized under western food, Japanese food, and Korean traditional food. Further, the seeing thing is classified into a small category including a natural cave, a theme park, a waterfall, and a beach.

In addition, the buying thing is classified into a wholesale mart, a duty-free shop, a department store, and a traditional market and the sleeping thing is classified into a smaller category categorized under a condo, a pension, and a hotel. Further, the riding thing is classified into a smaller category categorized under a rental car, a bus, a call taxi, and an airplane.

Besides, in the structure of the service ontology 120, related positional information on the services includes place information which is included in each service information. In the structure of the service ontology 120, a structure classified depending on the positional information of the services will be described with reference to an embodiment of FIG. 3B.

FIG. 3B illustrates service positional relationship information of a service ontology structure for providing a location/social relationship recognition type social network service.

In FIG. 3B, the positional information included in the service information is classified by utilizing a local code (i.e., GPS or administrative district code) for each province/state and city on the basis of Korea location information. Although the embodiment of FIG. 3B is prepared based on Korean administrative districts, the embodiment is not limited to Korea, but is applicable to countries throughout the world.

In this case, the related positional information on the services is interoperated with user positional information of the social ontology 110 so as to provide a dynamic service depending on the position when the user requests the service.

In the structure of the service ontology 120, the tag information included in the service information is interoperated with the tag relationship information of the tag ontology 130.

Meanwhile, a structure of the tag ontology will be described with reference to FIG. 2C.

Figure 2C:
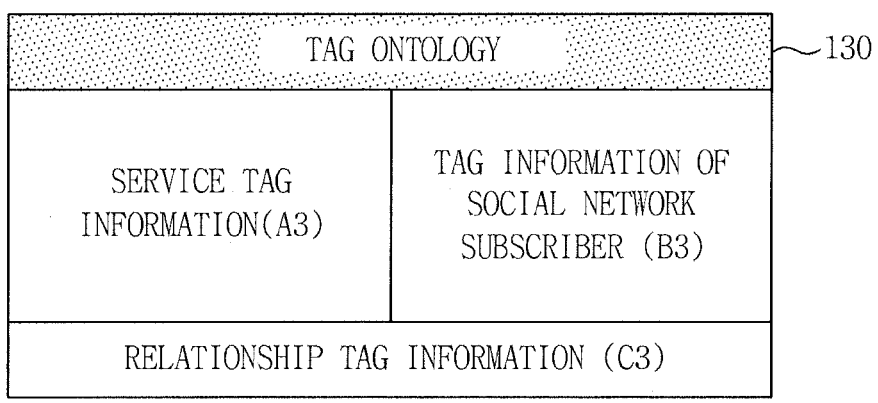
FIG. 2C is an exemplary diagram showing a structure of tag ontology according to an exemplary embodiment of the present invention.

As shown in FIG. 2C, the tag ontology 130 includes at least one of the tag information of the information included in the social ontology 110 and the service ontology 120 and the relationship information between the tags.

In this case, the tag ontology 130 has a structure in which the tag information of the information included in the social ontology 110 and the service ontology 120 and the relationship information between the tags are classified. The tag ontology 130 manages tags included in the user information of the social ontology 110 and the service information of the service ontology 120, and manages relationship information between the tags.

Accordingly, the user can easily retrieve the related service or tag information on the basis of the relationship between the service ontology 120 and the tag ontology 130.

Meanwhile, the service providing apparatus 200 includes a key input unit 210, a sensor unit 220, a GPS unit 230, an information collecting unit 240, a control unit 250, an ontology analysis unit 260, a service processing unit 270, and a service providing unit 280.

The key input unit 210 as a means for receiving a control command from the user receives a service request factor.

The sensor unit 220 includes a plurality of sensors sensing circumferential environment information of a user terminal.

Further, the GPS unit 230, in which a GPS module is installed, retrieves and provides GPS information of a location where the corresponding service providing apparatus 200 is positioned when the user requests the service from the user.

The information collecting unit 240 collects information sensed by the sensor unit 220 or the GPS unit 230 or the service request factor inputted through the key input unit 210 and provides them to the control unit 250.

The control unit 250 controls actuation of the GPS module installed in the GPS unit 230 when the user requests the service. In this case, the control unit 250 stores the GPS information collected by the information collecting unit 240 in relation with the user positional information of the social ontology 110.

Further, the control unit 250 outputs a control signal to the ontology analysis unit 260, which analyzes an ontology relationship corresponding to the requested service when the user requests the service.

The ontology analysis unit 260 retrieves a tag corresponding to a user's current position and the service request factor by using the relationship between ontologies stored in the ontology storage unit 100 when the service request factor is inputted from the user.

In this case, the ontology analysis unit 260 retrieves relationship tag information of the social network subscriber corresponding to the relationship information with the social network subscriber defined by the social ontology 110.

Further, the ontology analysis unit 260 retrieves relationship tag information of the service corresponding to the user's current position by comparing the related positional information on the services defined in the service ontology 120 with the user's current position.

For example, when the service request factor is a 'delicious restaurant' and the user's current position is 'Gangnam', the ontology analysis unit 260 retrieves a service corresponding to a delicious restaurant in Gangnam from the service ontology 120 and the tag ontology 130.

Further, the ontology analysis unit 260 retrieves relationship tag information of the service corresponding to the service request factor among the information of the services defined in the service ontology 120.

Thereafter, the service processing unit 270 extracts a corresponding service on the basis of the tag information and the relationship tag information retrieved by the ontology analysis unit 260.

The service providing unit 280 provides the user with the service extracted by the service processing unit 270.

The operation of the present invention configured as described above will be described in more detail.

FIG. 4 is a flowchart showing an operational flow for a method for providing a social network service using the relationship of ontology according to another embodiment of the present invention.

As shown in FIG. 4, when a service request factor is inputted from a user (S300), a control unit 250 verifies a user's current position on the basis of GPS information retrieved by a GPS module of a GPS unit 230 (S310).

Thereafter, an ontology analysis unit 260 retrieves relationship tag information of a service corresponding to the user's current position by using an ontology structure of the ontology storage unit 100 (S320).

Further, the ontology analysis unit 260 retrieves relationship tag information of a service corresponding to the inputted service request factor by using structures of ontologies (S330).

In this case, the service processing unit 270 extracts a corresponding service on the basis of the relationship tag information retrieved at steps 'S320' and 'S330' (S340) and a service providing unit 280 provides the user with the service extracted at step 'S340' (S350).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus for providing a social network service using the relationship of ontology, comprising:
    a processor, comprising:
        an ontology storage unit storing social ontology defining relationship information between a user and a social network subscriber, service ontology defining position and relationship information of services, and tag ontology defining tag information related to information included in the social ontology and the service ontology;
        an ontology analysis unit retrieving a tag corresponding to the user's current position and a service request factor by using the relationship of the ontologies stored in the ontology storage unit when the service request factor is inputted from the user;
        a service processing unit extracting the corresponding service on the basis of information of the retrieved tag; and
        a service providing unit providing the user with the extracted service,
    wherein the social ontology includes at least one of user's personal information, the user's current positional information, and the relationship information between the user and the social network subscriber,
    wherein the ontology analysis unit retrieves relationship tag information of a social network subscriber corresponding to the service request factor among the relationship information with the social network subscriber defined in the social ontology,
    wherein the service ontology includes at least one of the information on the services, and related positional information and relationship information of the services,
    wherein the ontology analysis unit retrieves relationship tag information of a service corresponding to the user's current position by comparing the user's current position with the related positional information of the services defined in the service ontology,
    wherein a social network is formed between the user and the social network subscriber in a location of the user's current position by linking using the social ontology, the service ontology and the tag ontology,
    wherein the tag ontology includes at least one of the tag information on the information included in the social ontology and the service ontology, and the relationship information between the tags, and
    further comprising an information collecting unit collecting the user's current positional information when the service request factor is inputted from the user.

2. The apparatus of claim 1, wherein the ontology analysis unit retrieves relationship tag information of a service corresponding to the service request factor among the information on the services defined in the service ontology.

3. The apparatus of claim 1, wherein the user's current positional information is GPS information detected by a GPS module.

* * * * *